M. McAuley,
Cotton Gin.
Nº 6,378.
Patented Apr. 24, 1849.
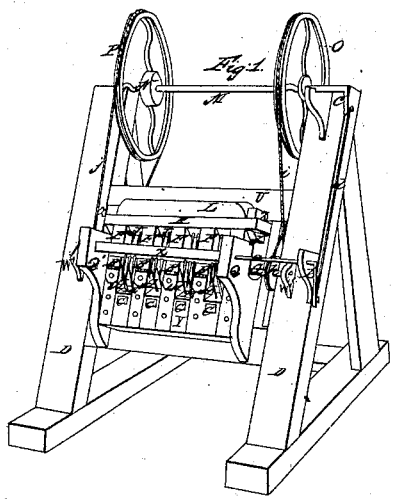
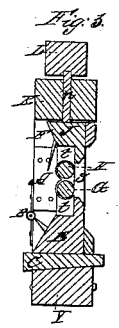
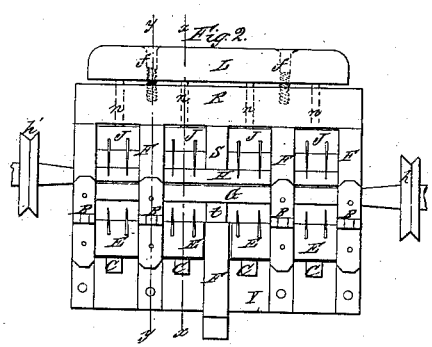
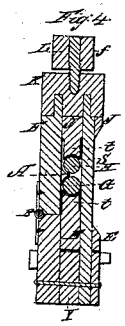
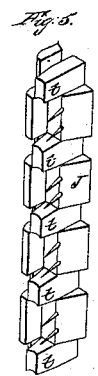

UNITED STATES PATENT OFFICE.

MALCOM McAULAY, OF THOMASVILLE, GEORGIA.

IMPROVEMENT IN COTTON-GINS.

Specification forming part of Letters Patent No. 6,378, dated April 24, 1849.

*To all whom it may concern:*

Be it known that I, MALCOM McAULAY, of Thomasville, in the county of Thomas and State of Georgia, have invented certain new and useful Improvements in Roller Cotton-Gins; and I do hereby declare the following to be a full, clear, and exact description thereof, reference being had to the accompanying drawings, making a part of this specification, in which—

Figure 1 is a perspective view of my improved roller cotton-gin; Fig. 2, a side elevation of the operating portion thereof detached; Fig. 3, a section in the line $x\ x$ of Fig. 2; Fig. 4, a section in the line $y\ y$ of Fig. 2; and Fig. 5, a perspective view of a portion, J, of the machine detached.

Similar letters indicate like parts in all the figures.

The principle of my invention consists in combining a double series of ribs, F F and S S, and adjustable supporting-bearings $t\ t$, at short intervals, with the rollers G and H, the front ribs, F F, having plates A A secured to their sides with projecting points, having curved edges extending between and fitting to the peripheries of the rollers, (on each side of the supports $t\ t$,) for preventing the cotton from being drawn into the space between the rollers and the bearing-surfaces of their supports, which arrangement and combination enables me to use wooden rollers of smaller size, and consequently more efficient in their operation than those generally made use of, and also causing the rollers to be much more durable.

The supporting-frame for the movements of the cotton-gin is represented by Fig. 1, and may be constructed in any well-known or usual manner. The rollers G H are supported between the rear series of ribs, S S, the front series of ribs, F F, and the lateral adjustable bearing-supports $t\ t$, projecting opposite each other from the pieces J and E, between the front and rear series of ribs, as shown in Figs. 3 and 4. The lower roller, G, passes through a slot in the bracket Q at the right of the ribs F and S, and its journal works in the box $w$, secured to the portion D of the frame. This roller G is driven by a crossed band, $i$, passing from the large pulley O on the driving-shaft M to and around the pulley $h$ on the roller, as shown in Fig. 1. The upper roller, H, passes out from between the series of ribs and bearing-supports through an aperture in the bracket Q' at the left of the ribs, and its journal works in the box $w'$. This roller is driven by the band $j$, passing from the pulley P on the driving-shaft M to and around the pulley $h'$ upon the roller. The inclination which I generally give to the ribs F and S is shown in Fig. 1 of the drawings. The lower ends of both series of ribs are permanently secured to the strong timber Y, as shown in Fig. 4. Each one of the upper series of ribs, F F, has a hinged joint at B, as represented in the drawings. The pieces of timber E and J correspond with each other in shape, which shape is represented by Fig. 5. The notches in their sides receive the ribs F S when they (the pieces E and J) are placed in their appropriate positions between the ribs. The front series of ribs, F F, are thrown back on their hinged joints, to allow of the insertion of the piece E, the rollers G and H, and the piece J in their places. The ribs F F are then closed up over the pieces E J and the rollers, and the tenons at the upper ends of both series of ribs are inserted into mortises in the movable piece K. The bearing-supports $t\ t$ are pressed against the rollers by means of the wedges C C, inserted between the piece E and the beam Y, and by the wedges $z\ z$, inserted into mortises in the cross-piece U of the frame and bearing against the upper side of K, as shown in Fig. 1. Additional motion is imparted to the piece J by means of the cap L, confined to K by the screws $f\ f$, and acting upon the pins $n\ n$, passing through holes in K and bearing against J, as shown in Figs. 2 and 3. Metallic plates A are made fast to the sides of the front ribs, F F, from which points project between the rollers, having curved edges that accurately fit to their peripheries, and prevent the cotton from being drawn between the rollers and their bearing-supports $t\ t$, which would cause friction and speedy destruction to the rollers. Pointed teeth are inserted into the pieces E and J, between each of the ribs, and stand in the position represented in Fig. 3. A series of feeding-teeth are inserted into the vibrating bar Z, which has its bearings in the brackets Q Q, immediately in front of the rollers. A vibratory movement is imparted to the bar Z by means of the crank $b$, on the extremity of one of its journals, connected by the rod $d$ to the shorter crank $c$, at the extremity of one of the journals of the main shaft M. As the bar Z is vibrated on its axis, the teeth projecting therefrom pass between the teeth projecting from E and J, and the points of the vibrating teeth pass in close proximity to the rollers. A suitable hopper is placed over the rollers, ribs, and vibrating bar between the brackets Q Q', to receive the cotton for ginning. The action of the vibrating teeth projecting from Z serve to carry the cotton to the rollers, and also, in conjunction with the stationary teeth projecting from E and J, to open the cotton, and prevent too large masses from entering and clogging the rollers. The rollers may be geared and driven in any manner that may be preferred. The front series of ribs are jointed and confined at one end in such a manner that they can be readily detached, for the purpose of facilitating the removal of the rollers when they are worn out and supplying their places with new ones.

Having thus fully described my improvements in the roller cotton-gin, what I claim as my invention, and desire to secure by Letters Patent, is—

The combination of series of ribs F S and lateral adjustable bearing-supports $t\,t$ with the ginning-rollers, substantially in the manner and for the purpose herein set forth.

MALCOM McAULAY

Witnesses:
 W. G. PONDER.
 CHAS. H. REMINGTON.